Jan. 9, 1968 A. M. ROSFELDER 3,362,367
TRIMMING SYSTEM FOR UNDERWATER VEHICLES
Filed June 30, 1966 2 Sheets-Sheet 1
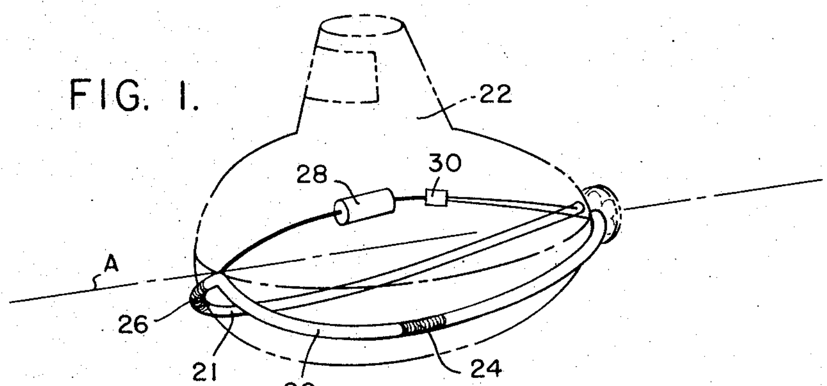
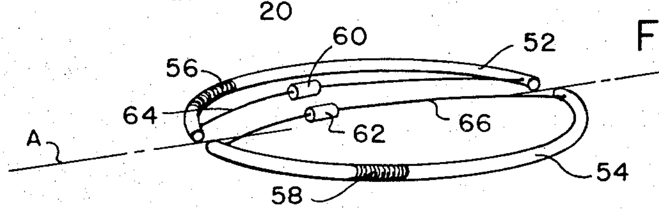
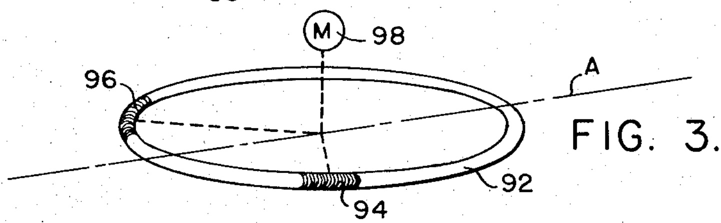
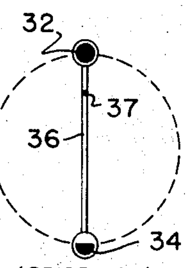
FIG. 4.
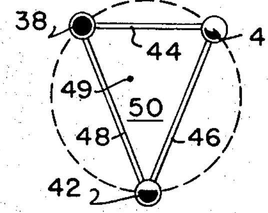
FIG. 5.
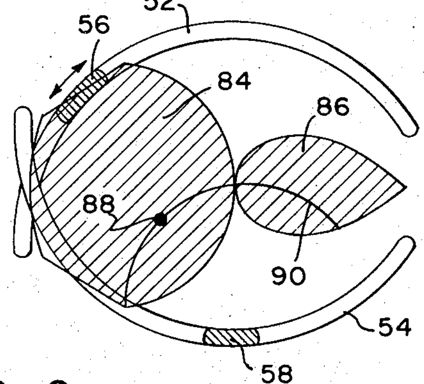
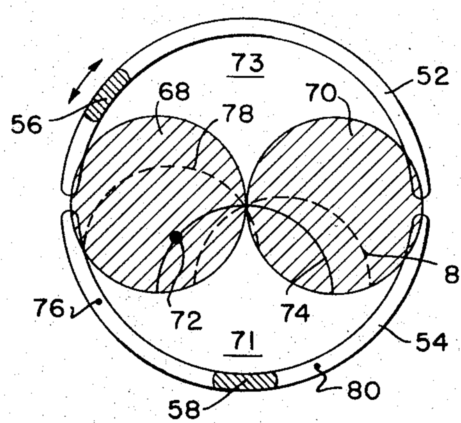
FIG. 6.
INVENTOR.
ANDRE M. ROSFELDER
BY Erwin F. Johnston
ATTORNEY.

TRIMMING SYSTEM FOR UNDERWATER VEHICLES

Filed June 30, 1966 2 Sheets-Sheet 2

INVENTOR.
ANDRE M. ROSFELDER
BY Irvin T. Johnston
ATTORNEY.

United States Patent Office 3,362,367
Patented Jan. 9, 1968

1

3,362,367
TRIMMING SYSTEM FOR UNDERWATER VEHICLES

Andre Marcel Rosfelder, La Jolla, Calif., assignor, by mesne assignments, to the United States of America as represented by the Secretary of the Navy Filed June 30, 1966, Ser. No. 562,453
8 Claims. (Cl. 114—16)

ABSTRACT OF THE DISCLOSURE

The description discloses a directional control system for an underwater vehicle which operates by altering the center of gravity of the vehicle. The control system may include a generally circular tube which is adapted to be mounted to the vehicle about its vertical axis. A pair of discrete weights may be slidably disposed within the tube and these weights may be shifted to various positions within the tube by a fluid. A means for selectively displacing this fluid may be provided. Upon selectively moving these weights the vehicle center of gravity is changed so as to cause directional control as it traverses the water.

The present invention relates to a control system for a vehicle such as an underwater vehicle and more particularly to a directional control system for a vehicle operated by altering the position of the center of gravity of the control system and, therefore, of the vehicle.

Man has long desired to go to the bottom of the ocean to there explore a new and beautiful world. The most effective apparatus of exploration known to date is the small underwater vehicle having an ability to withstand very high pressures and also having an ability to maneuver easily. Such vehicles have been built by several countries of the world and are now doing exploration in some of the deepest parts of our oceans.

Control systems of underwater vehicles now in use depend primarily on displacement of heavy fluids between reservoirs located in different sections of the vehicle. In the usual case the heavy fluid is mercury which is transferable between two oppositely placed reservoirs. More complicated systems consist of several reservoirs, for example, three reservoirs placed generally in a triangular pattern and having the mercury transferred between the three reservoirs as desired. In the case of transferring mercury between two reservoirs the center of gravity of the control system is positionable only along a geometric straight line drawn between the two reservoirs. In the case of the more complicated triangular shaped control system, the center of gravity of the system is movable anywhere within a geometric area defined by the three reservoirs, that is, within the triangle. The main difficulties and disadvantages of the prior art are the inability to accurately locate the center of gravity of the system and the great difficulty in shifting the center of gravity since a very complex pumping and conduit system is necessary to relocate the heavy mercury.

The present invention is a step forward in the area of vehicle directional control. The invention is capable of operating on such diverse items as underwater vehicles, vertical takeoff and landing aircraft, space-craft within a gravitational field or any other packaged device where it is desired to have the ability to alter the device's attitude to keep it static or relatively positioned. The system is simple to construct, extremely reliable and the center of gravity can be shifted very quickly and very accurately to a desired position. The present invention achieves these advantages by providing a guide means upon which a discrete weight is movable to a desired position along the guide means. The guide means may assume several configurations so that possible positions of the center of gravity can be easily planned.

2

An object of the present invention is to provide a simply constructed and reliable directional control system.

Another object is to provide a selectively shiftable center of gravity for a vehicle.

Another object of the present invention is to provide a directional control system which is easily operated and which is extremely accurate in its placement of the center of gravity so as to provide sensitive directional control.

A further object is to provide a directional control system wherein the limitations applied to the shifting center of gravity are alterable.

A still further object is to provide for a directional control system which greatly eliminates certain unwanted movements and compensates for other movements so as to give the vehicle an inherent stability.

Other objects, advantages and novel features of the invention will become apparent from the following detailed description of the invention when considered in conjunction with the accompanying drawings wherein:

FIG. 1 is a preferred embodiment, in a dihedral relationship, located about an underwater vehicle shown in phantom lines;

FIG. 2 is second preferred embodiment in a coplanar relationship;

FIG. 3 is third preferred embodiment in a coplanar relationship;

FIG. 4 is a diagrammatic view of a two reservoir prior art system;

FIG. 5 is a diagrammatic view of a three reservoir prior art system;

FIG. 6 is a diagrammatic plan view showing the limitations to movement of the center of gravity of the embodiment shown in FIG. 2;

FIG. 7 is a diagrammatic plan view showing the center of gravity limitations after relocation of the guide means;

Figure 8:
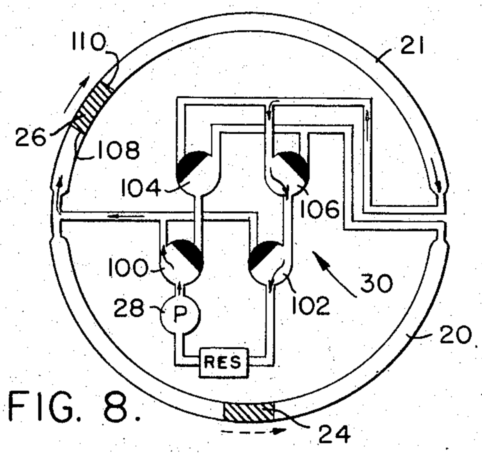
FIG. 8 is a diagrammatic view of a pumping and valve arrangement for the embodiment shown in FIG. 1 or FIG. 2 showing the valves positioned to cause a movement of a weight.

Referring now to the drawings wherein like reference numerals designate like or corresponding parts throughout the several views, FIGS. 1, 2 and 3 illustrate exemplary embodiments of the invention. Generally, FIG. 1 shows guide means such as curved tubes 20 and 21 attached around an underwater vehicle 22 which is shown in phantom lines. Within tubes 20 and 21 are discrete weights 24 and 26 which may be of equal weight, one weight located on each side of the underwater vehicle 22. Pump means 28 and valve means 30 are selectively connected to the forward and after ends of tubes 20 and 21 so as to send hydraulic fluid through the tubes to position the weight 24 or 26 in any desired location. Positioning the weights also positions the center of gravity of the system in a predetermined manner thereby causing a shift in attitude of the underwater vehicle. Since the weights 24 and 26 can be accurately placed anywhere along the tubes, directional control of the underwater vehicle becomes very simple. In addition, an inherent advantage of using discrete weights within a tube is the obsolescence of fins or wings attached to the underwater vehicle. Removal of such fins enables a designer to streamline and simplify the exterior of the vehicle.

FIG. 4 diagrammatically shows a prior art directional control system. The system consists of two reservoirs 32 and 34 adapted to be filled with a heavy fluid such as mercury and connected together by conduit 36. To achieve directional control the mercury is pumped from one reservoir to another through the conduit 36; the movement causes a shift in the center of gravity of the system and thereby of the vehicle. However, since there are only two reservoirs, the center of gravity of the system can only be positioned somewhere along conduit 36 or within one of the reservoirs 32 or 34. Directional control is therefore very limited by such a system. In the system shown in FIG. 4, the center of gravity would be located at point 37.

FIG. 5 shows a prior art system which is somewhat improved over that system shown in FIG. 4. The system is made up of three reservoirs 38, 40 and 42 and three conduits 44, 46 and 48. A heavy fluid such as mercury may be transferred between the three reservoirs as desired. The ability to transfer fluid between any of the three reservoirs 38, 40 and 42 enables the center of gravity 49 of the system to be located anywhere within the triangular pattern 50 defined by the three reservoirs and corresponding three conduits.

In more detail, FIG. 2 is comprised of two guide means 52 and 54 which may be oppositely disposed curved flexible tubes, the tubes lying in the same generally horizontal plane. Slidably disposed within each tube are discrete weights 56 and 58. A discrete weight may be a heavy solid such as interconnecting metal discs or a heavy fluid such as a flexible container filled with mercury. In either case the weight must be sufficiently heavy to establish a center of gravity of the control system which will influence the attitude of the underwater vehicle. Pump and valve means 60 directs a fluid which fills tube 52 so as to enable an operator to displace weight 56 along tube 52 to any desired position. Correspondingly, pump and valve means 62 allows fluid which fills tube 54 to be displaced so as to move weight 58 to any desired location within tube 54. It is understood that pump and valve means 60 and 62 and accessory tubing 64 and 66 which communicate the tubes 52 and 54 with their respective pump and valve means are shown diagrammatically in FIG. 2, since the pump and valve means 60 and 62 and tubing 64 and 66 may be placed in any one of many locations within the underwater vehicle. The same applies to the pump and valve means 28 and 30 shown in FIG. 1 and to the means for selectively moving the discrete weights in FIG. 3.

FIG. 6, a diagrammatic view of the embodiment shown in FIG. 2, illustrates by shaded areas 68 and 70 the possible positions of the center of gravity of the weights 56 and 58. As shown, placement of weight 56 and weight 58 establishes the center gravity of the system at point 72. By holding weight 58 stationary and sliding weight 56 along its tube 52 the center of gravity can shift anywhere along line 74. Weight 58 may be moved to a position 76 within tube 54 and then held stationary and weight 56 may slide along tube 52 thereby causing the center of gravity to position itself along dotted line 78. Or weight 58 may be moved to position 80 along tube 54 and then held stationary while weight 56 may slide along tube 52, thereby causing the center of gravity to then position itself somewhere along dotted line 82. It is shown, therefore, that by sliding weight 58 to an infinite number of locations along tube 54 and then holding weight 58 stationary while weight 56 is slid along tube 52 to an infinite number of positions and then reversing the operation of the two weights, the center of gravity of the system may be located anywhere within the shaded areas 68 and 70. An added advantage is achieved by limiting the positions of the center of gravity to the areas 68 and 70 in that there will be no undesirable rolling motion from side to side because the center of gravity cannot be placed within the areas 71 and 73.

FIG. 7 illustrates the patterns 84 and 86 into which the center of gravity may be positioned if the tubes 52 and 54 are moved so as to overlap at one end while the other ends are moved further apart. With weight 56 and weight 58 positioned as shown, the center of gravity will be located at point 88. By holding weight 58 stationary and sliding weight 56 along tube 52 the center of gravity may be moved along line 90. As explained in regard to FIG. 6, the weights 56 and 58 may be repositioned so as to achieve the patterns 84 and 86.

FIG. 3 illustrates another embodiment of the invention wherein guide means 92 may be a track upon which discrete weights 94 and 96 are selectively movable by suitably connected motor means 98. In one embodiment motor means 98 may be mounted directly on each weight and engage the guide means. Track 92 is shown in a closed circular form allowing weights 94 and 96 to be moved anywhere along the entire track. The center of gravity, therefore, of the system may be positioned within the boundaries of a circle defined by track 92.

FIG. 1, as mentioned earlier, shows an embodiment comprising tubes 20 and 21 and weights 24 and 26 which embodiment is similar to that shown in FIG. 2. The FIG. 1 embodiment, however, has a major advantage not contained in the embodiment shown in FIG. 2. Each of the tubes 20 and 21 lies in a different plane, wherein the two planes may intersect at the longitudinal axis A of the underwater vehicle to form a dihedral angle. Since the weights 24 and 26 can move in a forward-rearward direction, a side to side direction and also in an up-down direction, the positions of the center of gravity may be similar to that shown in FIG. 6 except the center of gravity of the FIG. 1 embodiment would not be limited to movement in a single plane as would the center of gravity of the system shown in FIG. 2. The movement of the center of gravity of the embodiment shown in FIG. 1 is three dimensional. The effect of having the center of gravity of the control system acting along a plane slanted with respect to a horizontal plane of the underwater vehicle is to cause the formation of a force couple which tends to cause the plane wherein the center of gravity of the control system is located to move away from its slanted position to a parallel position relative to a horizontal plane of the vehicle. This force couple gives the vehicle an inherent stability which makes maneuverability and control of the vehicle extremely easy.

FIG. 8 illustrates in diagrammatical form the necessary pump and valve means to achieve movement of the weights 24 and 26 within tube 20 of the embodiment shown in FIG. 1. By having valves 100, 102, 104 and 106 positioned as shown, pump 28 moves hydraulic fluid within tube 20 to cause a movement of weight 26 in the direction of the arrow. High pressure fluid will force against the side 108 of weight 26 whereas fluid will be evacuated from the tube adjacent side 110 of weight 26. The differences in pressure adjacent the ends 108 and 110 will cause movement of weight 26 in the direction of lower pressure. The pressure adjacent the ends of weight 24 remain constant and substantially equal causing weight 24 to remain stationary. By reversing valve 106 a pressure difference is created about the ends of weight 24 causing the weight 24 to be moved in a direction shown by a dotted arrow. Meanwhile, weight 26 will remain stationary.

Figure 9:
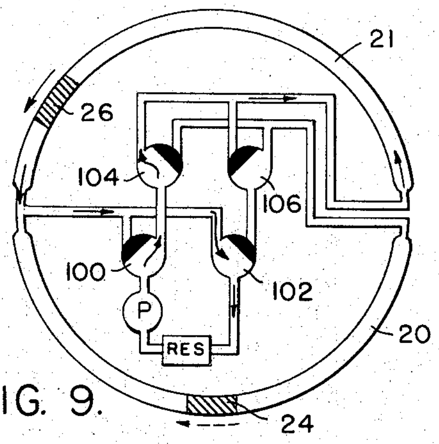
FIG. 9 is similar to FIG. 8 showing the valves positioned to cause a reverse movement of the weight.

FIG. 9 illustrates the position of valves 100, 102, 104 and 106 when it is desired to move weight 26 in a direction opposite that shown in FIG. 8. By reversing the position of valve 104 the weight 24 may be moved in a direction as shown by the dotted arrow.

Figure 10:
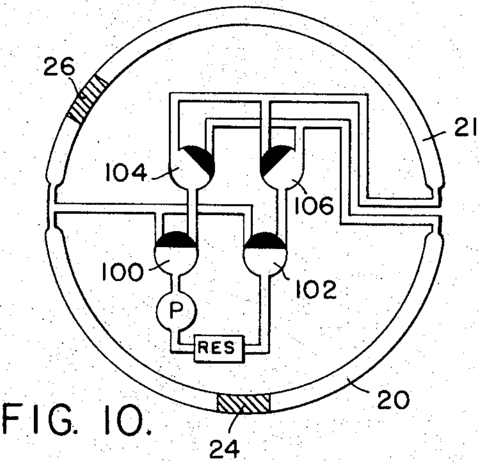
FIG. 10 is similar to FIG. 8 showing the weights held stationary.

FIG. 10 shows the position of valves 100 and 102 when it is desired to keep weights 24 and 26 in a stationary position. Placement of valves 104 and 106 have no effect when valves 100 and 102 are as shown in FIG. 10.

Figure 11:
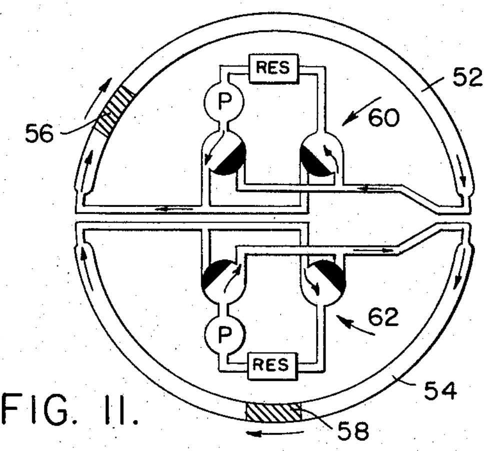
FIG. 11 is a diagrammatic view of a pump and valve arrangement for the embodiment shown in FIG. 2 or FIG. 1 showing the valves set to cause movement of the weights.
Figure 12:
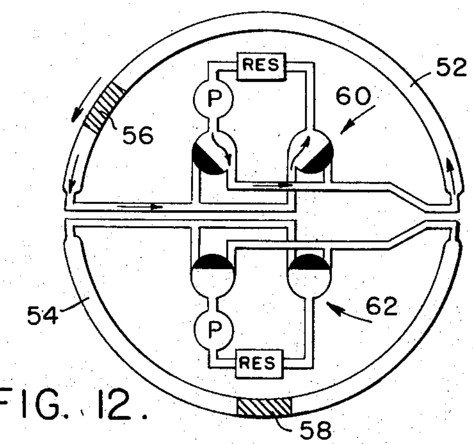
FIG. 12 is similar to FIG. 11 showing different movement.
Figure 13:
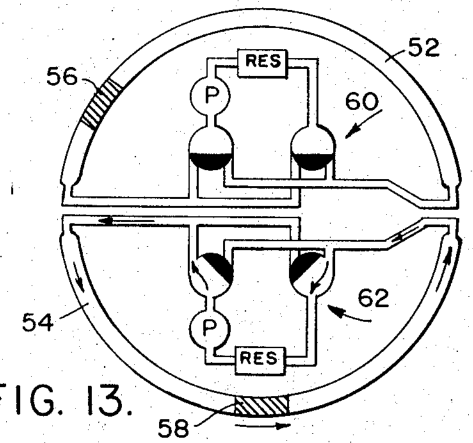
FIG. 13 is similar to FIG. 11 showing a still different movement.

FIG. 11 illustrates a diagrammatic view of a pump and valve means for an embodiment as shown in FIG. 2. There is shown two identical sets of pump and valve means 60 and 62, the valves positioned to cause movement of both weights. As illustrated in FIG. 12, the valve means are positioned to cause movement of the weight 56 in the directions shown by the arrow while weight 58 is held stationary. FIG. 13 shows the valve means positioned to hold weight 56 stationary while weight 58 is moved. It is understood that each of the pump and valves means 60 and 62 are independent of the other and may be operated independently. It is also understood that the pump and valve means as shown in FIG. 8 are not restricted to use in an embodiment shown in FIG. 1 but may be used in an embodiment as shown in FIG. 2. Likewise, the pump and valve means shown in FIG. 11 may be used in an embodiment as shown in FIG. 1 as well as the embodiment shown in FIG. 2.

*Operation*

The directional control system operates by moving a discrete weight along a guide means thereby shifting the center of gravity of the system which in turn affects the attitude of the vehicle. As was shown, the center of gravity of each of the embodiments in FIGS. 1, 2 and 3 is located at a point equally distant from the two weights. By holding one weight stationary and moving the other weight to a desired location the center of gravity of the directional control system may be altered in a desired way so as to cause a change of position of the forces acting upon the moving underwater vehicle. The change of forces acting on the moving vehicle causes the vehicle to adopt a new attitude thereby causing movement in a new direction. The vehicle, if properly designed so that the propulsion thrust is in a fixed position, can be directionally controlled by the proposed invention to accomplish the following movements:

(1) Referring to the embodiment shown in FIG. 2 (and FIGS. 6 and 12), the operation of the invention in one particular direction, leftward descent, will be explained in detail. When the weights 56 and 58 are diametrically opposed with weight 58 being in the position as shown in FIG. 12, the vehicle will move in a generally horizontal direction with respect to the ground. If it is desired to descend to the left, pump and valve means 60 and 62 are positioned so as to move weight 56 forwardly while weight 58 is held stationary, as shown in FIG. 12. As weight 56 is moved within tube 52 the center of gravity of the directional control system will position along line 74, FIG. 6, until it reaches a predetermined position such as point 72 which is within area 68, to the left of the central longitudinal axis A of the vehicle. Since the center of gravity of the system is now forward and leftward of the original equilibrium point, the tangent point between circular area 68 and 70, the underwater vehicle will tend to move in a leftward descending direction until the center of gravity is repositioned to level the underwater vehicle.

(2) In a similar manner to that shown for leftward descent, rightward descent is caused by holding weight 56 stationary while weight 58 is moved forward along tube 54 so that the center of gravity is positioned within the area 68 to the right of the central longitudinal axis A of the vehicle.

(3) Forward descent of the underwater vehicle will take place when the two discrete weights 56 and 58, FIG. 6, are moved forward within tubes 52 and 54 respectively so that the center of gravity of the system is positioned along the longitudinal axis of the vehicle within area 68. The valve position for moving weight 56 is shown in FIG. 12, while the position for moving weight 58 is shown in FIG. 11.

(4) Forward ascent will result when the two discrete weights 56 and 58 are moved rearwardly so that the center of gravity of the system is positioned along the longitudinal axis A of the vehicle within area 70.

(5) Leftward ascent is achieved by keeping weight 56 stationary while moving the weight 58 rearwardly in tube 54 so as to place the center of gravity within area 70 and to the right of the longitudinal axis A of the vehicle.

(6) Rightward ascent is achieved by holding weight 58 stationary while moving weight 56 rearwardly along tube 52 so that the center of gravity is positioned within area 70 and to the left of the longitudinal axis A of the vehicle.

(7) The opposite motions will take place if propulsion thrust is reversed.

Obviously many modifications and variations of the present invention are possible in the light of the above teachings. For example, the directional control system may be adapted to aircraft, particularly vertical takeoff and landing aircraft, hovercraft, spacecraft or any instrument package where it is desired to control attitude within some fluid medium and under a gravitational force influence. It is therefore to be understood that within the scope of the appended claims the invention may be practiced otherwise than as specifically described.

I claim:

1. A directional control system for a vehicle comprising:

guide means adapted to extend in a plane transverse to a vertical axis of the vehicle;

said guide means including a pair of oppositely disposed curved tubes, said tubes being in a dihedral relationship;

a discrete weight slidably disposed within each tube;

a fluid disposed within the tubes; and means for selectively displacing the fluid, whereby directional control is achieved by shifting the vehicle's center of gravity.

2. A directional control system in a vehicle comprising:

curved guide means extending generally transversely in a horizontal plane of the vehicle;

a discrete weight carried by said guide means for moving along said guide means to establish a movable center of gravity for the vehicle; and means for selectively moving the discrete weight along said guide means, whereby directional control is achieved by shifting the vehicle's center of gravity.

3. A directional control system in a vehicle as claimed in claim 2 wherein:

the guide means comprises two tubes oppositely disposed about a vertical longitudinal plane of the vehicle;

the discrete weight comprises a weight within each of said tubes, each weight for selectively moving within a respective tube; and the means for moving the weights comprise a fluid disposed within each of said tubes and means for selectively displacing the fluid in each of said tubes.

4. A directional control system in a vehicle as claimed in claim 3 wherein:

the weight comprises a flexible container, a quantity of mercury disposed within said flexible container and wherein the means for selectively displacing the fluid comprises a pump means connected to the tubes for displacing the fluid; and a valve means operatively connected to the pump means for selectively directing the fluid.

5. A directional control system in a vehicle as claimed in claim 3 wherein:

the weight comprises a plurality of interconnected metal discs and wherein the means for selectively displacing the fluid comprises a pump means connected to the tubes for displacing the fluid; and a valve means operatively connected to the pump means for selectively directing the fluid.

6. A directional control system in a vehicle as claimed in claim 3 wherein:

each of said tubes is movable about the vehicle.

7. A directional control system in a vehicle as claimed in claim 3 wherein:

said oppositely disposed tubes are in a co-planar relationship.

8. A directional control system in a vehicle as claimed in claim 2 wherein:

the guide means forms a closed curve; and the means for moving the discrete weight comprises motor means operatively connected to said discrete weight.

References Cited

UNITED STATES PATENTS

| | | | |
|---|---|---|---|
| 732,920 | 7/1903 | Cable | 114—125 |
| 2,952,235 | 9/1960 | Salomon | 114—125 |
| 2,963,245 | 12/1960 | Bolton | 114—125 X |

FERGUS S. MIDDLETON, *Primary Examiner*.

MILTON BUCHLER, T. M. BLIX, *Examiners*.